(12) United States Patent
Schineller

(10) Patent No.: US 11,052,486 B2
(45) Date of Patent: Jul. 6, 2021

(54) METHOD AND APPARATUS FOR PRODUCING A STRUCTURE SEED LAYER USING A LASER BEAM

(71) Applicant: AIXTRON SE, Herzogenrath (DE)

(72) Inventor: Bernd Schineller, Aachen (DE)

(73) Assignee: AIXTRON SE, Herzogenrath (DE)

( * ) Notice: Subject to any disclaimer, the term of this patent is extended or adjusted under 35 U.S.C. 154(b) by 55 days.

(21) Appl. No.: 16/346,975

(22) PCT Filed: Nov. 8, 2017

(86) PCT No.: PCT/EP2017/078545
§ 371 (c)(1),
(2) Date: Jun. 18, 2019

(87) PCT Pub. No.: WO2018/087118
PCT Pub. Date: May 17, 2018

(65) Prior Publication Data
US 2020/0061749 A1    Feb. 27, 2020

(30) Foreign Application Priority Data
Nov. 9, 2016 (DE) .............. 10 2016 121 462.0

(51) Int. Cl.
*B23K 26/354* (2014.01)
*B23K 26/0622* (2014.01)
(Continued)

(52) U.S. Cl.
CPC ........ *B23K 26/354* (2015.10); *B23K 26/0006* (2013.01); *B23K 26/0624* (2015.10);
(Continued)

(58) Field of Classification Search
CPC ............... B23K 26/354; B23K 26/355; B23K 26/0624; B23K 26/0006; B23K 26/0738; B23K 26/0846
See application file for complete search history.

(56) References Cited

U.S. PATENT DOCUMENTS

| | | | | |
|---|---|---|---|---|
| 5,486,427 A | * | 1/1996 | Koskenmaki | H01L 24/29 428/546 |
| 2009/0121219 A1 | * | 5/2009 | Song | C01B 32/162 257/43 |
| 2014/0291308 A1 | * | 10/2014 | Lasagni | B23K 26/0676 219/121.75 |

FOREIGN PATENT DOCUMENTS

| EP | 0997261 A1 | 5/2000 |
|---|---|---|
| EP | 2591875 A1 | 5/2013 |

(Continued)

OTHER PUBLICATIONS

International Search Report dated Apr. 11, 2018, from the ISA/European Patent Office, for International Patent Application No. PCT/EP2017/078545 (filed Nov. 8, 2017), 6 pages.

(Continued)

*Primary Examiner* — Michael P Wieczorek
(74) *Attorney, Agent, or Firm* — Ascenda Law Group, PC

(57) ABSTRACT

In a method for producing a structured seed layer for carbon nanotubes to be deposited thereon, energy is applied by means of a laser beam to a metal layer previously applied to a substrate such that the metal layer is broken up into individual islands. The laser beam is expanded into a beam having a linear cross-section, and a linear exposure zone of the metal layer is simultaneously exposed to the expanded beam. The exposure zone is moved across the metal layer in a direction transverse to the length of the exposure zone. An apparatus for carrying out the method comprises a device for transporting a substrate with a metal layer applied thereto, a (Continued)

laser to produce a laser beam, and a device for expanding the laser beam to produce a linear exposure zone that extends perpendicularly to the direction in which the substrate is transported.

12 Claims, 2 Drawing Sheets

(51) Int. Cl.
 B23K 26/00 (2014.01)
 B23K 26/073 (2006.01)
 B23K 26/08 (2014.01)
 C01B 32/16 (2017.01)
 B23K 101/34 (2006.01)
 B23K 103/16 (2006.01)
 B23K 101/16 (2006.01)

(52) U.S. Cl.
 CPC ...... *B23K 26/0738* (2013.01); *B23K 26/0846* (2013.01); *C01B 32/16* (2017.08); *B23K 2101/16* (2018.08); *B23K 2101/34* (2018.08); *B23K 2103/172* (2018.08)

(56) References Cited

FOREIGN PATENT DOCUMENTS

| JP | 2014084245 A | 5/2014 |
| WO | 2014/192955 A1 | 12/2014 |
| WO | 2015036426 A1 | 3/2015 |

OTHER PUBLICATIONS

Written Opinion dated Apr. 11, 2018, from the ISA/European Patent Office, for International Patent Application No. PCT/EP2017/078545 (filed Nov. 8, 2017), 13 pages.

International Preliminary Report on Patentability dated May 14, 2019, from the International Bureau of WIPO, for International Patent Application No. PCT/EP2017/078545 (filed Nov. 8, 2017), 15 pages.

Xia; et al., The fabrication of periodic metal nanodot arrays through pulsed laser melting induced fragmentation of metal nanogratings, Nanotechnology (2009), 20:285310, 5 pages.

Zacharias; et al., "Das Wachstum von Nanodrähten (The growth of nanowires)", Physik Journal (Physics Journal) (2005), 4(5):29-34, machine generated translation included, 13 pages.

* cited by examiner

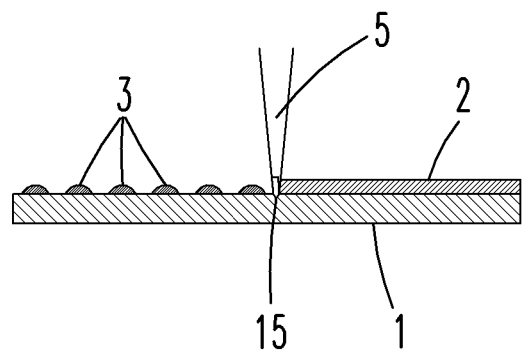
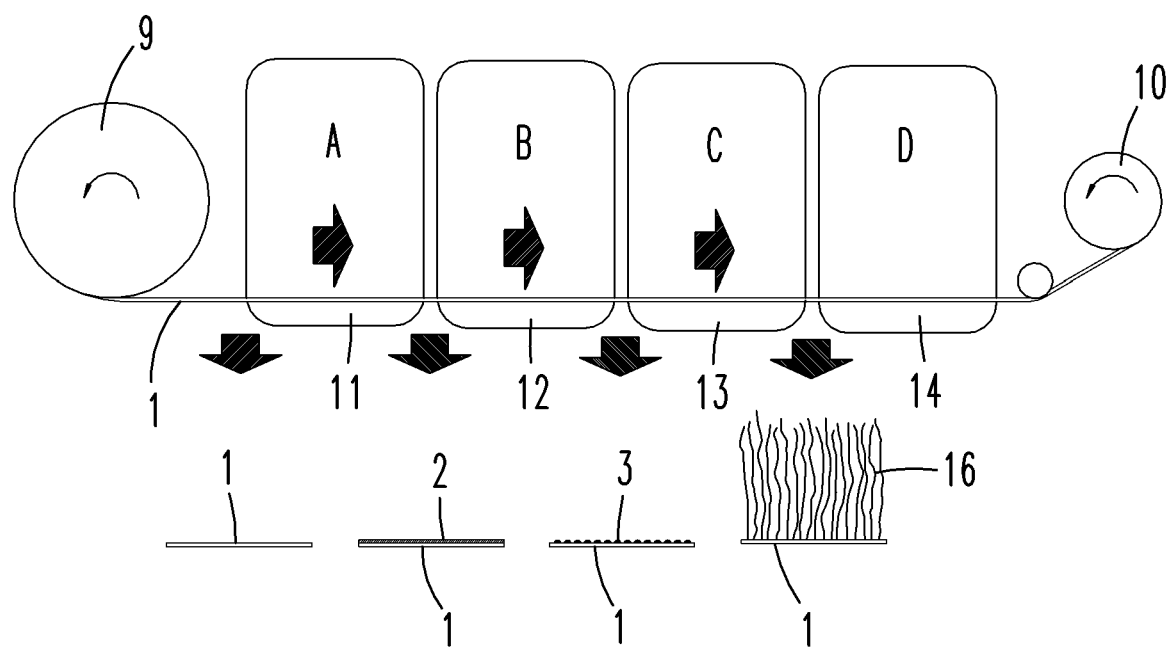

METHOD AND APPARATUS FOR PRODUCING A STRUCTURE SEED LAYER USING A LASER BEAM

RELATED APPLICATIONS

This application is a National Stage under 35 USC 371 of and claims priority to International Application No. PCT/EP2017/078545, filed 8 Nov. 2017, which claims the priority benefit of DE Application No. 10 2016 121 462.0, filed 9 Nov. 2016.

FIELD OF THE INVENTION

The invention relates to a method for producing a structured seed layer for carbon nanotubes to be deposited thereon, wherein a metal layer previously applied to a substrate is subjected to the energy of a laser beam such that the metal layer is broken up into individual islands.

The invention also relates to an apparatus for the execution of the method.

BACKGROUND

US 2009/0121219 A1 describes the production of a seed cell arrangement for the deposition of carbon nanotubes (CNTs). A metal layer deposited on a substrate is rapidly heated with a plasma, or a laser beam, or in another manner (rapid thermal annealing). This results in the formation of droplet-shaped structures that lie close to one another.

EP 0997261 A1 describes the use of a laser beam expanded into a line for purposes of laser welding. Here a mask is used, which is placed on the workpiece.

EP 2591875 A1 describes a laser with a beam transformation lens, which expands the laser beam linearly. By means of a laser mask, this laser is used for the mask welding of plastic parts.

The paper "The fabrication of periodic metal nanodot arrays through pulsed laser melting induced fragmentation of metal nanogratings", Nanotechnology 20 (2009) 285310, of 23 Jun. 2009, describes a method for the formation of a regular droplet arrangement on a surface. A "nanograting" in the form of parallel linear trenches is first applied to the surface. Metal lines are applied transverse to the trenches. By bombardment with a single laser pulse, metal droplets of the same size are formed at the intersections of the metal lines and the trenches. If, on the contrary, a laser pulse is applied to a closed layer, unevenly distributed droplets of irregular size form.

In the paper "Das Wachstum von Nanodrähten (The growth of nanowires)", Physik Journal (Physics Journal) 4 (2005) No. 5, page 29, the production of semiconductor nanowires is described, in which metal islands are deposited on a surface by means of SiO2 spheres, on which nanodroplets are formed.

SUMMARY OF THE INVENTION

The object underlying the invention is that of specifying measures with which the formation of seed zones for a CNT coating can be reproducibly controlled, wherein it is in particular required that the size of the seed zones and their spacings can be reproducibly configured.

The object is achieved by the invention specified in the claims, wherein the dependent claims not only represent advantageous developments of the invention specified in the subordinate claims, but also independent achievements of the object.

First of all and essentially, it is proposed that a linear exposure zone be produced, wherein during the continuous or pulsed exposure of the linear exposure zone, the entire area of the exposure zone is subjected to a light intensity simultaneously, such that only local heating is generated, and not as is the case with a punctiform laser beam that writes and moves along each line in turn. In accordance with the invention, the linear exposure zone travels at an adjustable velocity over the metal layer that has previously been deposited on the substrate. This can take place by a movement of the laser beam, but preferably by a movement of the substrate, wherein the substrate is particularly preferably unwound from one storage reel and rewound onto a second storage reel. Thus a narrow zone travels over the substrate, heating the metal layer to essentially the same temperature at the same time over its entire width, which corresponds to the width of the substrate, so that a temperature gradient is formed essentially only in the writing direction, but not transverse to the writing direction. The parameters of laser power, and if necessary, pulse energy or pulse duration, together with the transport velocity of the substrate, can be used to configure the diameters of the island-shaped seed zones and their spacings. The thickness of the metal layer and the length of the expanded laser beam measured in the direction of transport, which corresponds to the width of the exposure zone, serve as further parameters for presetting the size and distribution of the island-shaped seed zones on the substrate surface. The length of the linear exposure zone preferably extends over the entire substrate, such that the width of the expanded laser beam is of the order of 20 to 1,000 mm. The laser beam, which has a linear cross-section, can have a length of 0.5 to 5 mm. This length corresponds to the width of the exposure zone. The wavelength of the laser light can range from 200 nm to 1,500 nm. In the case of a pulsed laser, the pulse energy can lie between 0.5 and 20 mJ. The velocity at which the exposure zone moves relative to the coated substrate can range between 1 and 50 cm/s, preferably between 5 and 30 cm/s. By selecting the laser power, the length of the laser beam, which corresponds to the width of the exposure zone, and the transport velocity of the substrate, the equivalent circular diameters of the island-shaped seed cells can be configured. These preferably lie between 1 nm and 2 µm, preferably between 1 nm and 200 nm, and particularly preferably between 1 nm and 100 nm. The mean spacing between the island-shaped seed zones can also be preset by means of these parameters. It lies preferably in the range between 1 nm and 2 µm, preferably in a range between 1 nm and 500 nm, and particularly preferably between 1 nm and 100 nm. The spacing can, on the one hand, take the form of the spacing between the centres of adjacent island-shaped seed zones. However, it can also take the form of the spacing between two edges of adjacent island-shaped seed zones. The spacing is then the lateral length of a gap between adjacent island-shaped seed zones. The formation of the island-shaped seed zones is a self-organising system, wherein the island-shaped seed zones typically arrange themselves on the corner points of rectangular, and in particular square, or nearly square, unit cells.

The invention also relates to an apparatus for the execution of the method, wherein the apparatus has at least one laser that generates a laser beam, and an optical element with which the laser beam, which has a punctiform cross-section, is expanded into a linear cross-section. With a transporting device, a substrate can be transported relative to the expanded laser beam, wherein the direction of transport is transverse to the length of the zone exposed to the laser beam. The substrate can be unwound from one reel and rewound onto another reel. A device can be arranged between the two reels, with which the metal layer is deposited on the substrate. Downstream of this device, in the direction of transport, is located the device containing the laser. Downstream of this device, in the direction of transport, is located a device with which carbon nanotubes can be deposited on the seed zones. Further devices are also envisaged with which, for example, supplementary process steps can be executed, for the production of electrodes for a lithium ion battery from the foil coated with carbon nanotubes. The substrate can have a width of between 100 and 1,000 mm. Typically the width is 300 to 600 mm. The substrate can be unwound from one reel and rewound onto another reel. However, the substrate can also take the form of a rigid wafer with a diameter in the range from 50 mm to 450 mm. Silicon and sapphire are particularly suitable wafer materials for the substrates. Flexible metallic substrates, for example, substrates made of aluminium or copper, are preferred for roll-up substrates. Aluminium, nickel, silver, gold, lithium, titanium, vanadium, chrome, iron, platinum or tantalum are preferably used for the metal coating. A typical layer thickness lies between 1 nm and 200 nm.

BRIEF DESCRIPTION OF THE FIGURES

In what follows, an example of an embodiment of the invention is explained with the aid of the accompanying figures. Here:

FIG. 3 shows a longitudinal section through the substrate in FIG. 1 at the point where an expanded laser beam 5 produces an exposure zone 15, FIG. 4 shows schematically an apparatus for the execution of the inventive method.

DETAILED DESCRIPTION OF THE INVENTION

Figure 1:
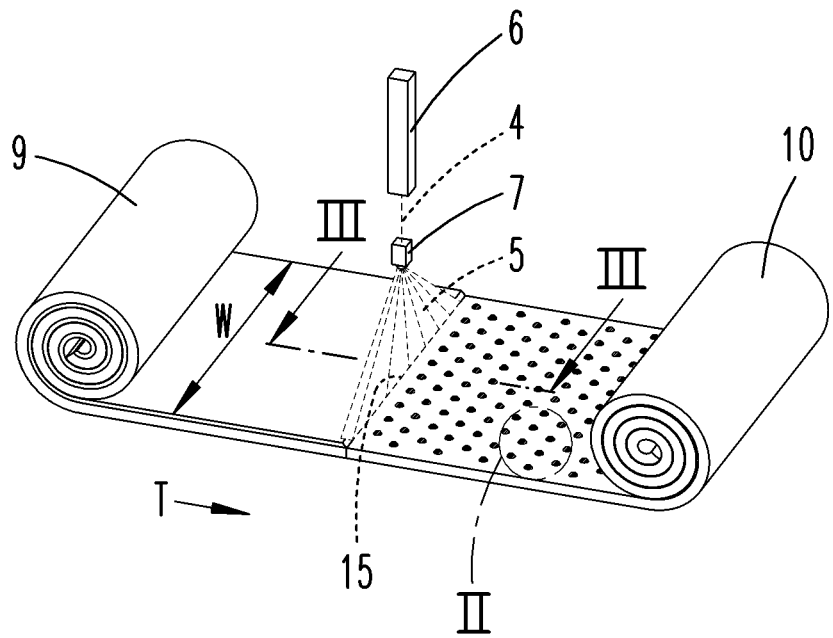
FIG. 1 shows an outline schematic of the exposure method in perspective.
Figure 2:
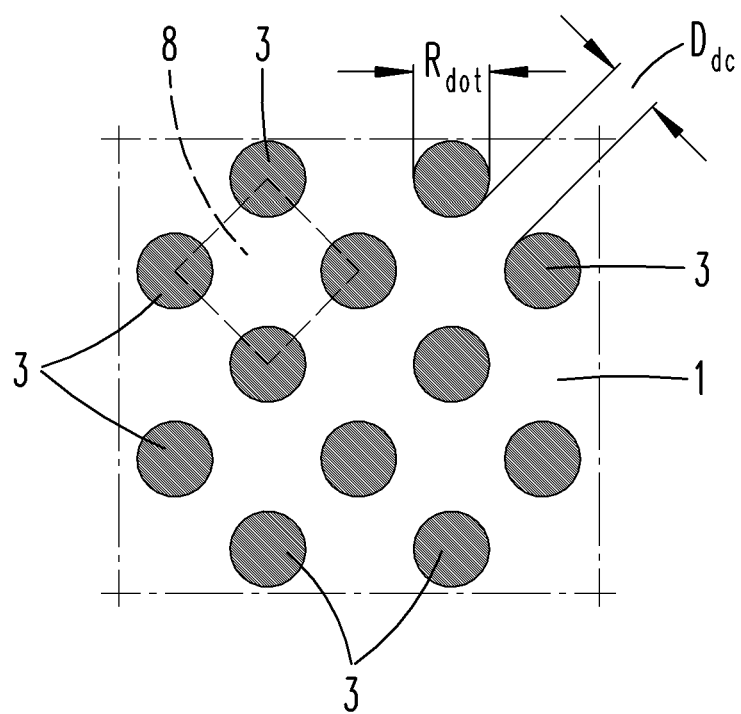
FIG. 2 enlarges the detail II in FIG. 1 relating to the arrangement of the island-shaped seed zones 3.

The inventive method is not only suitable for the treatment of substrates stored on reels, in particular such substrates that are coated with a metal layer 2, but also for the treatment of uncoated substrates 1, and for the treatment of substrates in the form of semiconductor wafers. FIG. 1 shows an outline schematic of a variant of the method, in which a substrate 1 coated with a metal layer 2 is wound on a first reel 9, from which it is unwound in a direction of transport T. A laser 6 is used to generate a laser beam 4 with a punctiform cross-section. With an optical expansion device 7, the punctiform laser beam 4 is expanded into a linear laser beam 5. The width of the linear laser beam 5, in the region in which it impinges onto the layer 2, corresponds at least to the width W of the substrate 1.

The expanded laser beam 5 generates a linear exposure zone 15 on the surface of the substrate coated with a layer 2. As a result of the transport of the substrate in the direction of transport T, the linear exposure zone 15 travels transverse to its length over the coating 2 of the substrate 1.

As a consequence of the energy applied by the pulsed or continuously generated laser beam, energy in the form of heat is coupled into the metal layer 2 at each point in the exposure zone 15 at the same time. By virtue of the simultaneous exposure of the entire linear surface, virtually no temperature gradient forms in the length direction of the exposure zone 15, but only in the direction of movement of the latter. As a result, the material of the metal layer 2 is organised into island-shaped seed zones 3. The island-shaped seed zones 3 lie approximately on the corner points of squares and have a diameter RDot of between 1 and 100 nm. The individual island-shaped seed zones 3 are spaced apart from each other by the distance DDc of between 1 and 100 nm.

The transport velocity is between approximately 5 and 30 cm/s.

FIG. 4 shows an outline schematic of an apparatus for the deposition of carbon nanotubes 16 on a substrate 1. The substrate 1, consisting of a metal, for example copper or aluminium, is unwound from a first reel 9 and transported with a transport velocity through a production apparatus consisting of a plurality of stages. The treated substrate is rewound onto a second reel 10.

The apparatus has a first station 11 where a metal layer 2 is deposited on the substrate 1. In a second station 12, a surface treatment of the metal layer 2 is carried out with an expanded laser beam, with an apparatus designed in accordance with FIG. 1, such that the punctiform seed zones 3 are formed, spaced apart from each other. In a further station 13, carbon nanotubes 16 are deposited on the seed zones 3. In one or a plurality of further stations 14, further treatment steps can be undertaken, which are usually required in the manufacture of electrodes for a lithium ion battery.

In the figures the island-shaped seed zones 3 are illustrated in a greatly enlarged manner in order to clarify their even arrangement on the substrate 1. In reality, the islands 3 are spaced apart from each other in the submicron range. The surface area of the island-shaped seed zones 3 and the spacing between the island-shaped seed zones 3 can be reproducibly configured using the parameters specified above, such as laser power and layer thickness.

In the inventive method, a closed metal layer is first deposited on an unstructured substrate. The metal layer preferably covers the substrate surface completely, such that the width of the metal layer matches the width of the substrate. An expanded laser beam whose width corresponds to the width of the metal layer is used to apply energy to the metal layer over its entire width simultaneously. The substrate is transported relative to the linear laser treatment zone, transverse to the direction of the linearly expanded laser beam, such that the laser treatment zone travels over the substrate.

Although no structuring has been carried out either on the metal coating or underneath the metal coating, a multiplicity of essentially equally spaced metallic islands is formed in the region of the laser treatment zone. The metal layer retreats locally into island-shaped regions. The island-shaped seed zones thereby formed are typically located at the corners of rectangular unit cells.

The invention thus preferably relates to a method for producing a structured seed layer for carbon nanotubes 16 to be deposited thereon, wherein a closed homogeneous metal layer 2 is first applied to an unstructured surface of a substrate 1, and the metal layer 2 is subsequently energised by a laser beam 4, wherein the laser beam 4 is expanded to a beam 5 that is linear in cross-section, with which a linear exposure zone 15 of the metal layer 2 is simultaneously exposed, wherein the exposure zone 15 travels over the metal layer 2 at such a travel velocity in a direction transverse to its length, and the laser beam 4 in the exposure zone 15 applies energy to the metal layer with such an energy density, that the metal layer 2 converts to individual islands 3 of essentially equal size, which are essentially equidistant from one another, wherein the equivalent circular diameters of the islands 3 are smaller than 2 µm, and the distance between two adjacent islands 3, which is free of metal layer, is less than 2 µm.

The extent of the expanded laser beam 5 measured in the direction of travel, that is to say, its length, which corresponds to the width of the exposure zone 15, preferably lies in a range between 0.5 mm and 1.5 mm. In the case of a pulsed laser beam, the pulse rate is so high that the exposure zone 15 is quasi-continuously exposed to light. In particular, the pulse frequency is considerably higher (by a factor 10) than the quotient of the travel velocity and the width of the exposure zone 15. While no temperature gradient occurs in the metal layer 2 melted by laser impingement over the length of the exposure zone 15, that is to say, in the linear direction of the expanded laser beam, a high temperature gradient occurs in the direction of travel of the laser beam.

The above statements serve to explain the inventions recorded as a whole by the application, which develop further the state of the art, at least by means of the following combinations of features, and also independently, namely:

A method, which is characterised in that the laser beam 4 is expanded into a beam 5, linear in cross-section, with which a linear exposure zone 15 of the metal layer 2 is simultaneously exposed, which exposure zone 15 travels, in a direction transverse to its length, over the metal layer 2.

A method, which is characterised in that the width W of the laser beam corresponds to a width of the substrate 1, and lies in a range between 20 mm and 1,000 mm, or between 100 mm and 1,000 mm.

A method, which is characterised in that the width W of the expanded laser beam 5 lies in the range between 300 and 600 mm.

A method, which is characterised in that the substrate 1 consists of silicon, sapphire, aluminium, copper, or another metal.

A method, which is characterised in that the metal layer 2 consists of aluminium, nickel, silver, gold, lithium, titanium, vanadium, chromium, iron, platinum, tantalum, or another noble or base metal.

A method, which is characterised in that the thickness of the metal layer lies in the range between 1 and 200 nm.

A method, which is characterised in that the length of the laser beam extending transverse to the width W of the expanded laser beam 5, which corresponds to the width of the exposure zone 15, is 0.5 to 5 mm.

A method, which is characterised in that the wavelength of the light generated by the laser 6 lies in the range between 200 nm and 1.5 µm.

A method, which is characterised in that the laser 6 emits pulsed or continuous light, wherein the pulse energy lies in the range between 0.5 and 20 mJ.

A method, which is characterised in that the velocity with which the expanded laser beam 5 travels over the metal layer 2 lies in the range between 1 and 50 cm/s, preferably between 5 and 30 cm/s.

A method, which is characterised in that the island-shaped seed zones 3 have equivalent circular diameters of 1 nm to 2 µm, preferably 1 nm to 500 nm, and particularly preferably 1 nm to 100 nm, and/or in that the distances between the centres of adjacent island-shaped seed zones 3 lie in the range between 1 nm and 2 µm, preferably between 1 nm and 500 nm, and particularly preferably between 1 and 100 nm.

A method, which is characterised by a rectangular, in particular square or nearly square arrangement of the island-shaped seed zones 3.

An apparatus, which is characterised by a device 9, 10 for transporting a substrate 1, with a metal layer 2 applied thereon, and a laser 6 for generating a laser beam 4, and a device 7 for expanding the laser beam so as to generate a linear exposure zone 15, wherein the device 7 is arranged such that the linear exposure zone 15 extends perpendicularly to the direction of transport of the substrate 1.

An apparatus, characterised by a device for unrolling a substrate wound onto a reel 9, a device 11 for coating the substrate 1 with a metal layer 2, which is arranged in a direction of transport of the substrate 1 upstream of the device 7 for expanding the laser beam, a device 13 for depositing carbon nanotubes 16 on the island-shaped seed zones 3, and a device for holding a reel 10, onto which the processed substrate is wound.

All disclosed features are essential to the invention (both individually, and also in combination with one another). In the disclosure of the application, the disclosure content of the associated/attached convention documents (transcript of the prior application) is hereby also incorporated in full, also for the purpose of incorporating features of these documents in the claims of the present application. The subsidiary claims characterise with their features independent inventive developments of the prior art, in particular in order to make divisional applications on the basis of these claims.

LIST OF REFERENCE SYMBOLS

1 Substrate
2 Metal layer
3 Islands
4 Laser beam
5 Expanded laser beam
6 Laser
7 Optics
8 Elementary cell
9 Reel
10 Reel
11 First station
12 Second station
13 Further station
14 Further station
15 Exposure zone
16 Carbon nanotube
T Direction of transport
W Width

What is claimed is:

1. A method for producing a structured seed layer for a deposition of carbon nanotubes (16), wherein a metal layer (2), which is disposed on a surface of a substrate (1), is subjected to energy of a laser beam (4) generated by a laser (6) such that the metal layer (2) is broken up into individual islands-shaped seed zones (3), the method comprising:
    expanding the laser beam (4) into an expanded laser beam (5) having a linear cross-section;
    exposing a linear exposure zone (15) of the metal layer (2) simultaneously along the linear exposure zone (15) to the expanded laser beam; and
    moving the linear exposure zone (15) across the metal layer (2) in a direction transverse to a length of the linear exposure zone (15).

2. The method of claim 1, wherein a width (W) of the expanded laser beam (5) corresponds to a width of the substrate (1) and lies in a first range between 20 mm and 1,000 mm.

3. The method of claim 2, wherein the width (W) of the expanded laser beam (5) lies in a second range between 300 mm and 600 mm.

4. The method of claim 1, wherein the substrate (1) consists of silicon, sapphire, aluminium, or copper.

5. The method of claim 1, wherein the metal layer (2) consists of aluminium, nickel, silver, gold, lithium, titanium, vanadium, chromium, iron, platinum, or tantalum.

6. The method of claim 1, wherein a thickness of the metal layer (2) lies in a range between 1 mm and 200 nm.

7. The method of claim 1, wherein a length of the laser beam (4), extending transverse to the length of the linear exposure zone (15), is 0.5 mm to 5 mm.

8. The method of claim 1, wherein a wavelength of the laser beam (4) generated by the laser (6) lies in a range between 200 nm and 1.5 μm.

9. The method of claim 1, wherein the laser (6) emits (i) pulsed light with pulse energy between 0.5 mJ or 20 mJ or (ii) continuous light.

10. The method of claim 1, wherein a velocity with which the expanded laser beam (5) travels over the metal layer (2) lies in a range between 1 cm/s and 50 cm/s.

11. The method of claim 1, wherein (i) the island-shaped seed zones (3) have equivalent circular diameters of 1 nm to 2 μm, and/or (ii) a space between respective centers of adjacent ones of the island-shaped seed zones (3) lies in a range between 1 nm and 2 μm.

12. The method of claim 1, wherein adjacent ones of the island-shaped sees zones (3) are arranged on corner points of a rectangular cell.

* * * * *